United States Patent
Turunen et al.

(10) Patent No.: US 8,988,992 B2
(45) Date of Patent: Mar. 24, 2015

(54) METHOD, APPARATUS, AND COMPUTER PROGRAM PRODUCT FOR CONTENTION ACCESS IN WIRELESS COMMUNICATION

(71) Applicant: Nokia Corporation, Espoo (FI)

(72) Inventors: Markku Turunen, Helsinki (FI); Mika Kasslin, Espoo (FI); Enrico Rantala, Iittala (FI); Kari J. Leppanen, Helsinki (FI); Sami Virtanen, Espoo (FI)

(73) Assignee: Nokia Corporation, Espoo (FI)

( * ) Notice: Subject to any disclaimer, the term of this patent is extended or adjusted under 35 U.S.C. 154(b) by 215 days.

(21) Appl. No.: 13/735,423

(22) Filed: Jan. 7, 2013

(65) Prior Publication Data

US 2014/0192724 A1 Jul. 10, 2014

(51) Int. Cl.
*H04L 12/26* (2006.01)
*H04W 74/08* (2009.01)

(52) U.S. Cl.
CPC .................................. *H04W 74/0833* (2013.01)
USPC ........................................................ 370/229

(58) Field of Classification Search
CPC .................................. H04W 74/0808–74/0858
USPC ......... 370/229, 230, 235, 310, 329, 400, 431, 370/437, 445, 447, 462
See application file for complete search history.

(56) References Cited

U.S. PATENT DOCUMENTS

| | | | | |
|---|---|---|---|---|
| 7,095,754 | B2 * | 8/2006 | Benveniste | 370/465 |
| 7,187,691 | B2 * | 3/2007 | Gavette | 370/445 |
| 7,356,561 | B2 * | 4/2008 | Balachandran et al. | 709/203 |
| 7,944,940 | B2 * | 5/2011 | Ma et al. | 370/447 |
| 8,705,383 | B2 * | 4/2014 | Liu et al. | 370/252 |
| 8,737,425 | B2 * | 5/2014 | Wang et al. | 370/458 |
| 2010/0226297 | A1 | 9/2010 | Kasslin et al. | |
| 2010/0304756 | A1 | 12/2010 | Yang | |
| 2013/0195081 | A1 * | 8/2013 | Merlin et al. | 370/336 |
| 2014/0082185 | A1 * | 3/2014 | Abraham et al. | 709/224 |

OTHER PUBLICATIONS

Abraham: Scalable Discovery Packet Transmission-Social WiFi SIG Contribution, Nov. 16, 2012.

* cited by examiner

*Primary Examiner* — Dmitry H Levitan
(74) *Attorney, Agent, or Firm* — Locke Lord LLP

(57) ABSTRACT

Method, apparatus, and computer program product example embodiments enable contention for access to a wireless communications medium. In example embodiments, a method comprises initiating a channel access procedure by an apparatus; performing, by the apparatus, in response to the channel access procedure initiation, a random draw for permission to start contention with other member apparatuses of a group in which the apparatus belongs, the random draw being based on how many member apparatuses of the group are expected to compete for the wireless communications medium; and starting, by the apparatus, contention for access to the wireless communications medium, if the apparatus wins the random draw.

15 Claims, 7 Drawing Sheets

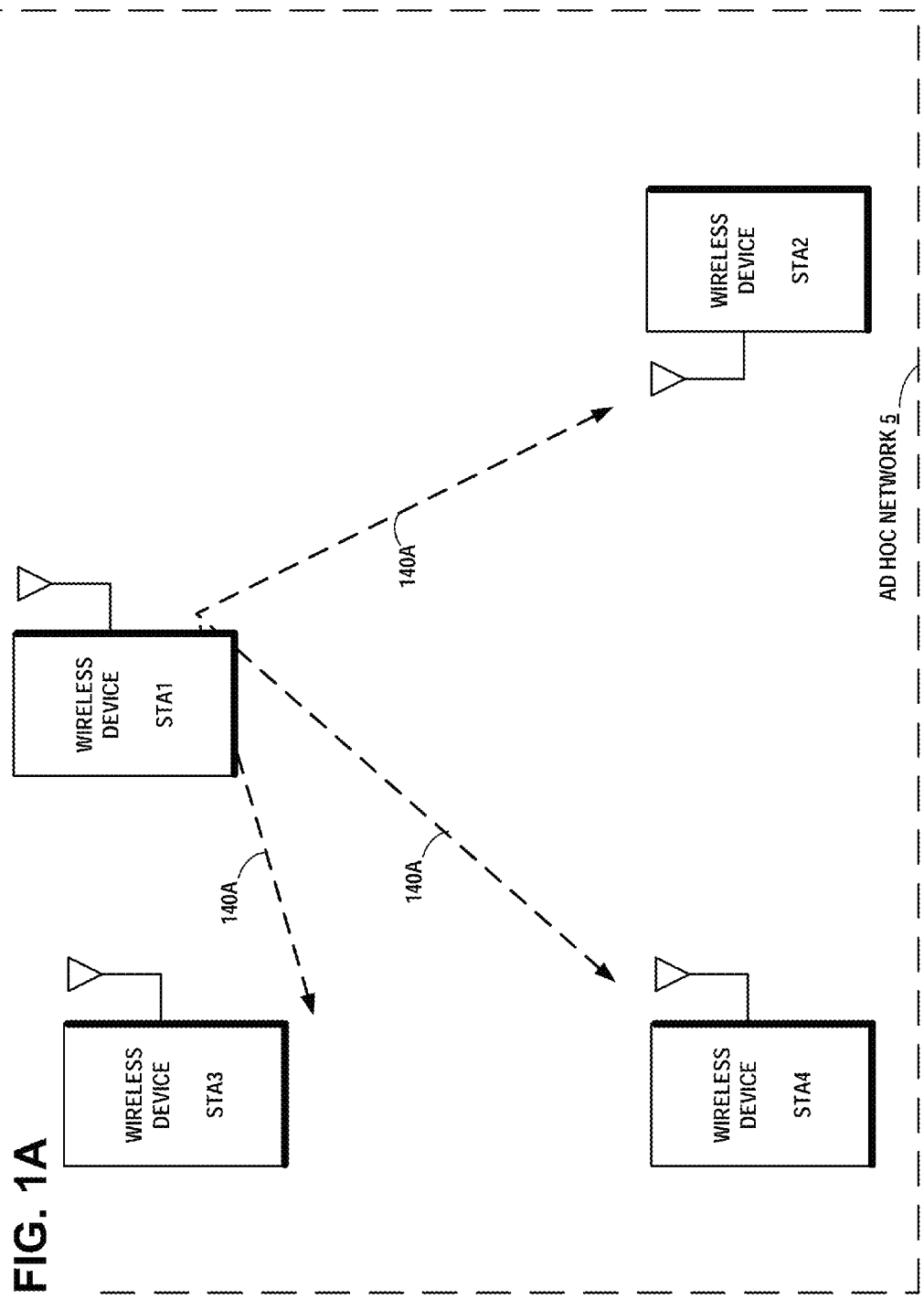

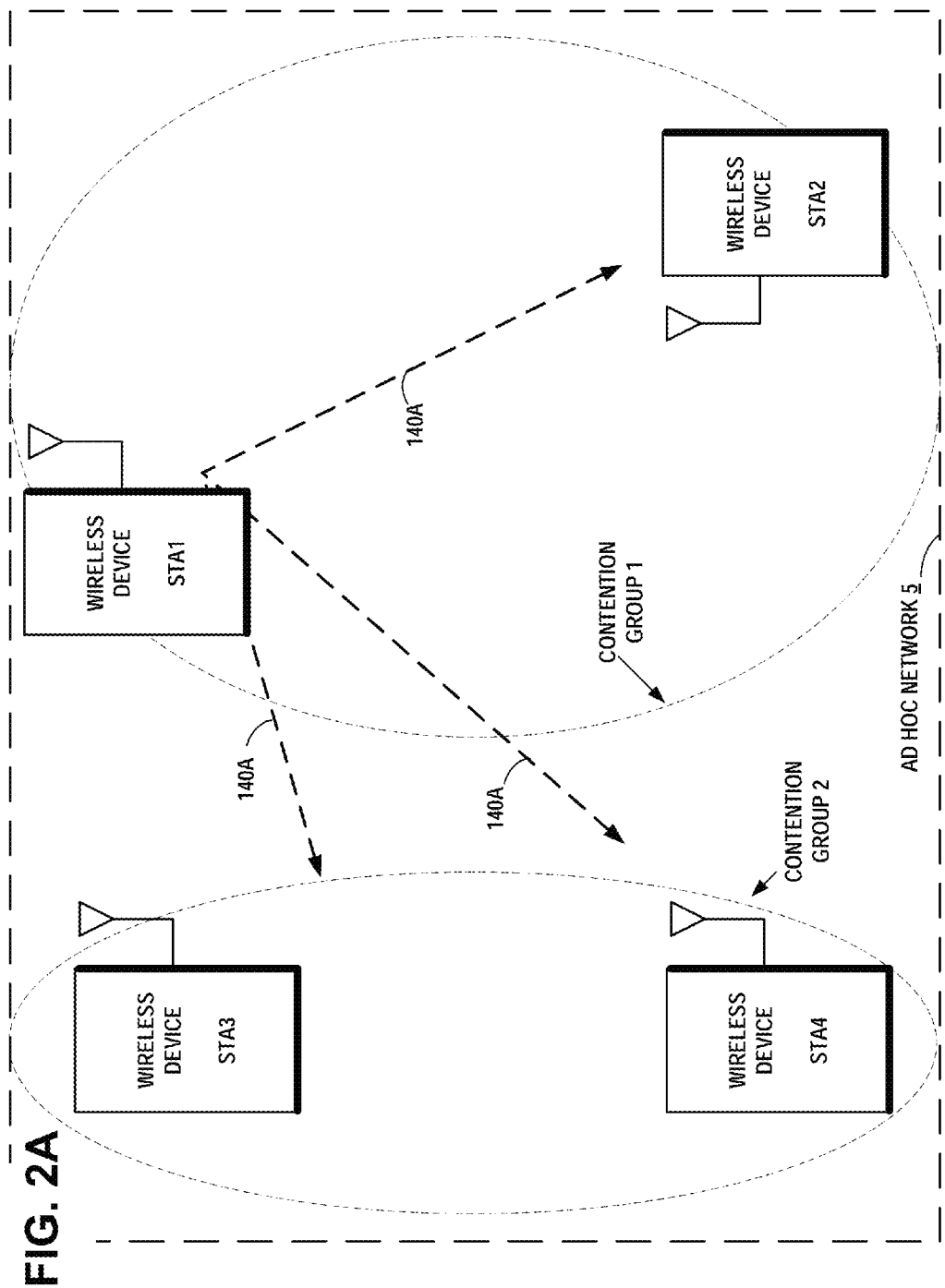

METHOD, APPARATUS, AND COMPUTER PROGRAM PRODUCT FOR CONTENTION ACCESS IN WIRELESS COMMUNICATION

FIELD

The field of the invention relates to wireless short-range communication and more particularly to contention for access to a wireless communications medium.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features that make them appropriate for various applications.

Applications for short-range wireless devices are evolving to include awareness applications providing the device with an awareness about the local network environment. Awareness applications have the promise of extending business and social networking by enabling users to share local contextual data in a peer-to-peer fashion by using their mobile wireless devices. For example, users may be able to share information in real-time for local-area business networking, social networking, dating, personal safety, advertising, publishing, and searching.

SUMMARY

Method, apparatus, and computer program product example embodiments enable contention for access to a wireless communications medium.

According to an example embodiment of the invention, a method comprises:

initiating a channel access procedure by an apparatus;

performing, by the apparatus, in response to the channel access procedure initiation, a random draw for permission to start contention with other member apparatuses of a group in which the apparatus belongs, the random draw being based on how many member apparatuses of the group are expected to compete for the wireless communications medium; and starting, by the apparatus, contention for access to the wireless communications medium, if the apparatus wins the random draw.

According to an example embodiment of the invention, a method comprises:

waiting, by the apparatus, until another member apparatus of the group completes its access to the wireless communications medium if the apparatus did not win the random draw;

performing, by the apparatus, a second random draw for permission to start a second contention with other members of the group, for access to the wireless communications medium, the second random draw being based on how many members of the group are expected to compete in the second random draw for permission to start contention for the wireless communications medium; and starting, by the apparatus, the second contention for access to the wireless communications medium, if the apparatus wins the second random draw.

According to an example embodiment of the invention, a method comprises:

wherein the channel access procedure initiation is triggered in response to receiving, by the apparatus, a wireless message including timing synchronization of the group of which the apparatus is a member.

According to an example embodiment of the invention, a method comprises:

wherein the channel access procedure initiation is triggered in response to transmitting, by the apparatus, a wireless message including timing synchronization of the group of which the apparatus is a member.

According to an example embodiment of the invention, a method comprises:

wherein the channel access procedure initiation is triggered in response to determining by the apparatus that a predetermined amount of time has elapsed from targeted transmission time of a wireless message including timing synchronization of the group of which the apparatus is a member.

According to an example embodiment of the invention, a method comprises:

wherein the contention for access to the wireless communications medium is by carrier sense multiple access.

According to an example embodiment of the invention, an apparatus comprises:

at least one processor;

at least one memory including computer program code;

the at least one memory and the computer program code configured to, with the at least one processor, cause the apparatus at least to:

initiate a channel access procedure;

perform in response to the channel access procedure initiation, a random draw for permission to start contention with other member apparatuses of a group in which the apparatus belongs, the random draw being based on how many member apparatuses of the group are expected to compete for the wireless communications medium; and start contention for access to the wireless communications medium, if the apparatus wins the random draw.

According to an example embodiment of the invention, an apparatus comprises:

the at least one memory and the computer program code configured to, with the at least one processor, cause the apparatus at least to:

wait until another member apparatus of the group completes its access to the wireless communications medium if the apparatus did not win the random draw;

perform a second random draw for permission to start a second contention with other members of the group, for access to the wireless communications medium, the second random draw being based on how many members of the group are expected to compete in the second random draw for permission to start contention for the wireless communications medium; and start the second contention for access to the wireless communications medium, if the apparatus wins the second random draw.

According to an example embodiment of the invention, an apparatus comprises:

wherein the channel access procedure initiation is triggered in response to receiving, by the apparatus, a wireless message including timing synchronization of the group of which the apparatus is a member.

According to an example embodiment of the invention, an apparatus comprises:

wherein the channel access procedure initiation is triggered in response to transmitting, by the apparatus, a wireless message including timing synchronization of the group of which the apparatus is a member.

According to an example embodiment of the invention, an apparatus comprises:

wherein the channel access procedure initiation is triggered in response to determining by the apparatus that a predetermined amount of time has elapsed from targeted transmission time of a wireless message including timing synchronization of the group of which the apparatus is a member.

According to an example embodiment of the invention, an apparatus comprises:

wherein the contention for access to the wireless communications medium is by carrier sense multiple access.

According to an example embodiment of the invention, a computer program product comprises computer executable program code recorded on a computer readable non-transitory storage medium, the computer executable program code comprising:

code for initiating a channel access procedure by an apparatus;

code for performing, by the apparatus, in response to the channel access procedure initiation, a random draw for permission to start contention with other member apparatuses of a group in which the apparatus belongs, the random draw being based on how many member apparatuses of the group are expected to compete for the wireless communications medium; and code for starting, by the apparatus, contention for access to the wireless communications medium, if the apparatus wins the random draw.

According to an example embodiment of the invention, a computer program product comprises:

code for waiting, by the apparatus, until another member apparatus of the group completes its access to the wireless communications medium if the apparatus did not win the random draw;

code for performing, by the apparatus, a second random draw for permission to start a second contention with other members of the group, for access to the wireless communications medium, the second random draw being based on how many members of the group are expected to compete in the second random draw for permission to start contention for the wireless communications medium; and code for starting, by the apparatus, the second contention for access to the wireless communications medium, if the apparatus wins the second random draw.

According to an example embodiment of the invention, a computer program product comprises:

wherein the channel access procedure initiation is triggered in response to receiving, by the apparatus, a wireless message including timing synchronization of the group of which the apparatus is a member.

According to an example embodiment of the invention, a computer program product comprises:

wherein the channel access procedure initiation is triggered in response to transmitting, by the apparatus, a wireless message including timing synchronization of the group of which the apparatus is a member.

According to an example embodiment of the invention, a computer program product comprises:

wherein the channel access procedure initiation is triggered in response to determining by the apparatus that a predetermined amount of time has elapsed from targeted transmission time of a wireless message including timing synchronization of the group of which the apparatus is a member.

According to an example embodiment of the invention, a computer program product comprises:

wherein the contention for access to the wireless communications medium is by carrier sense multiple access.

The resulting example embodiments enable contention for access to a wireless communications medium.

DESCRIPTION OF THE FIGURES

FIG. 1A illustrates an example network diagram of an ad hoc network where all of the STAs are in the same contention group, in accordance with at least one embodiment of the present invention.

FIG. 2A illustrates an example network diagram of an ad hoc network where a portion of the STAs are in a first contention group and another portion of the STAs are in a second contention group, in accordance with at least one embodiment of the present invention.

Figure 1B:
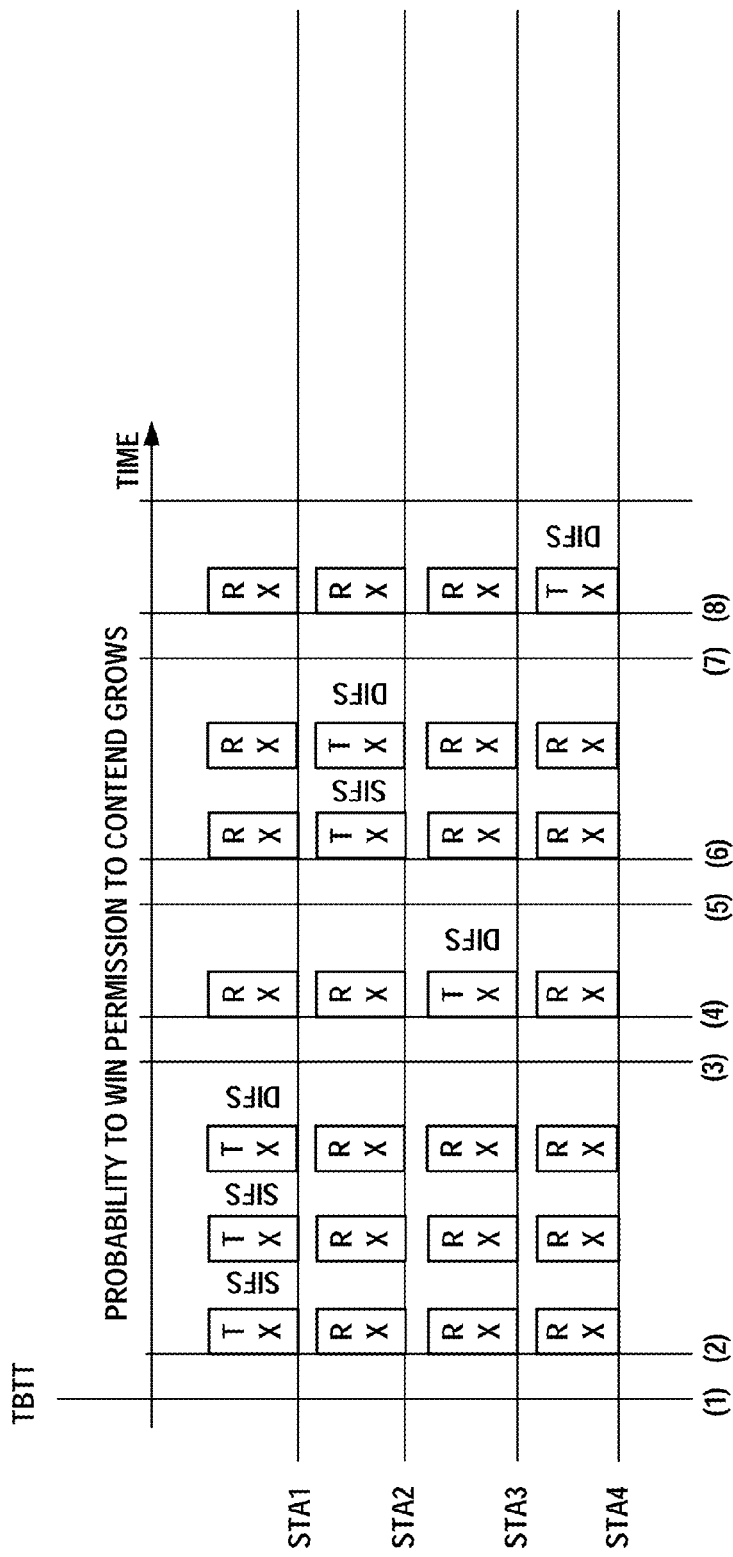
FIG. 1B illustrates an example timing diagram for the network of FIG. 1A, showing how contention spreading works where all of the STAs are in the same contention group, in accordance with at least one embodiment of the present invention.

DISCUSSION OF EXAMPLE EMBODIMENTS
OF THE INVENTION

This section is organized into the following topics:
A. WLAN Communication Technology
B. Awareness Network Technology
C. Contention Access in Wireless Communication
A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard IEEE 802.11-2012, Wireless Medium Access Control (MAC) and Physical Layer (PHY) Specifications, February 2012. Since then, emerging broadband applications have stimulated interest in developing very high-speed wireless networks for short range communication, for example, the planned IEEE 802.11 ac, and the planned IEEE 802.11 ad WLAN specifications that are to provide a very high throughput in various frequency bands. Applications of these IEEE 802.11 standards include products such as consumer electronics, telephones, personal computers, and access points for both for home and office.

A WLAN may be organized as an independent basic service set (IBSS) or an infrastructure basic service set (BSS). Wireless devices or stations (STAs) in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format is identical to that of an IEEE 48-bit address. In an ad hoc network, the BSSID is a locally administered, individual address that is generated randomly by the device that starts the ad hoc network.

Synchronization is the process of the devices in an ad hoc network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of an ad hoc network, and inquiring to find an ad hoc network. Once an ad hoc network is found, a device joins the ad hoc network. This process is entirely distributed in ad hoc networks, and relies on a common time base provided by a timing synchronization function (TSF). The TSF may maintain a 64-bit timer running at 1 MHz and updated by information from other devices. When a device begins operation, it may reset the timer to zero. The timer may be updated by information received in beacon frames.

Each wireless device or STA maintains a TSF timer with modulus $2^{64}$ counting in increments of microseconds. STAs expect to receive Beacon frames at a nominal rate. The interval between Beacon frames is defined by a Beacon Period parameter of the STA. A STA sending a Beacon frame sets the value of the Beacon frame's timestamp so that it equals the value of the STA's TSF timer at the time that the data symbol containing the first bit of the timestamp is transmitted to the PHY plus the transmitting STA's delays through its local PHY from the MAC-PHY interface to its interface with the antenna or light-emitting diode (LED) emission surface.

In an ad hoc network, since there is no access point (AP) to act as the central time source for the ad hoc network, the timer synchronization mechanism is completely distributed among the mobile devices of the ad hoc network. Since there is no AP, the mobile device that starts the ad hoc network will begin by resetting its TSF timer to zero and transmitting a Beacon, choosing a beacon period. This establishes the basic beaconing process for this ad hoc network. After the ad hoc network has been established, each device in the ad hoc network will attempt to send a Beacon after the target beacon transmission time (TBTT) arrives. To minimize actual collisions of the transmitted Beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process is a purely local process that occurs entirely internal to the mobile device. There is no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

There are three major types of medium access control (MAC) frames in the IEEE 802.11 protocol: the management frame, the control frame, and the data frame. Management frames provide management services. Data frames carry payload data. Control frames assist in the delivery of data and management frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

1. Beacon

The beacon frame is a management frame that is transmitted periodically to allow mobile devices to locate and identify an ad hoc network. Beacon generation in an IBSS is distributed. The value of the beacon period is included in Beacon and Probe Response frames, and devices or STAs adopt that beacon period when joining the IBSS. All members of the IBSS participate in beacon generation. Each STA maintains its own TSF timer that is used for Beacon Period timing. The beacon interval within an IBSS is established by the STA when the START request primitive is performed within a device to create the IBSS. This defines a series of target beacon transmission times (TBTT) exactly a Beacon Period apart, which is the time at which an ad hoc device must send a beacon. Time zero is defined to be a TBTT. At each TBTT the STA waits for the random backoff interval and then sends a Beacon frame if the random delay has expired and no other Beacon frame has arrived from the IBSS of which the STA is a member during the delay period.

The beacon frame includes the fields: timestamp, beacon interval, and capability information. The timestamp contains the value of the device's synchronization timer (TSF) at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, an optional ad hoc network parameter set, and an optional traffic indication map. There is no restriction on the format or content of the 32 byte SSID.

The first ad hoc device to become active establishes an IBSS and starts sending beacons that to maintain synchronization among the devices. Other ad hoc devices may join the network after receiving a beacon and accepting the IBSS parameters, such as the beacon interval, found in the beacon frame.

Each device that joins the ad hoc network may send a beacon periodically if it doesn't hear a beacon from another device within a short random delay period after the beacon is supposed to be sent. If a device doesn't hear a beacon within the random delay period, then the device assumes that no other devices are active and a beacon needs to be sent. A beacon signal is periodically transmitted from the ad hoc network. The beacon frame is transmitted periodically and includes the address of the sending device.

2. Probe Request

The probe request frame is a management frame that is transmitted by a mobile device attempting to quickly locate a wireless LAN. It may be used to locate a wireless LAN with a particular SSID or to locate any wireless LAN. The probe request frame may contain the service attribute request. The effect of receiving a probe request is to cause the device to respond with a probe response. When a wireless device arrives within the communication range of any member of an ad hoc network, its probe request frame inquiry signals are answered by a member of the ad hoc network detecting the inquiry. A device in an ad hoc network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

For active scans, the WLAN radio may broadcast a probe request on the medium it is scanning using a broadcast SSID in the probe request. The WLAN radio will add any received beacons or probe responses to a cached basic service set identifier (BSSID) scan list. For passive scans, the WLAN radio does not send a probe request, but instead, listens on a medium for a period of time and adds any received beacons or probe responses to its cached BSSID scan list. The WLAN radio may scan both infrastructure and ad hoc networks, regardless of the current setting of its network mode. The WLAN radio may use either the active or passive scanning methods, or a combination of both scanning methods. When performing an active scan, the WLAN radio sets the BSSID to the broadcast MAC address in the probe request it sends. The WLAN radio performs the scan across all the frequency mediums and bands that it supports.

3. Probe Response

Devices or STAs in an IBSS respond to probe requests if it is awake at a given time to receive and respond to the probe requests. In an IBSS, a STA that sent a Beacon frame remains in the Awake state and responds to probe requests, until a Beacon frame with the current BSSID is received. There may be more than one STA in an IBSS that responds to any given probe request, particularly in cases where more than one STA transmitted a Beacon frame following the most recent TBTT, either due to not receiving successfully a previous Beacon frame or due to collisions between beacon transmissions. In an IBSS, STAs receiving Probe Request frames respond with a probe response when the SSID in the probe request is the wildcard SSID or matches the specific SSID of the STA. In an IBSS a STA that transmitted a Beacon frame since the last TBTT responds to group addressed Probe Request frames. A STA in an IBSS responds to Probe Request frames sent to the individual address of the STA. Probe Response frames are sent as directed frames to the address of the STA that generated the probe request.

4. Carrier Sense Multiple Access with Collision Avoidance (CSMA/CA)

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

In a block acknowledgement (BA), instead of transmitting an individual ACK for every MAC protocol data unit (MPDU), multiple MPDUs may be acknowledged together using a single BA frame. Block Ack (BA) contains bitmap size of 64*16 bits. Each bit of this bitmap represents the success or failure status of a MPDU.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

5. Synchronization

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the mobile device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TBTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the mobile device. There may be no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

6. Quality of Service (QoS)

The Quality of Service (QoS) support in the IEEE 802.11 WLAN protocol is provided by access categories (ACs) and multiple independent backoff entities. The Quality of Service (QoS) support defines the MAC procedures to support local area network (LAN) applications with quality of service (QoS) requirements, including the transport of voice, audio, and video.

Packets are delivered by parallel backoff entities operating within the same WLAN device, where backoff entities are prioritized using AC-specific contention parameters. There are four access categories (ACs) and thus, four backoff entities exist in every WLAN device. The AC-specific contention parameters are labeled according to their target application: AC_VO for voice or audio packets, AC_VI for video packets, AC_BE for packets whose delivery is on a best effort basis, and AC_BK for background packets. The four access categories (ACs) define the priorities in accessing the medium by setting individual interframe spaces, contention windows, and other medium access parameters per access category (AC).

Contention-based medium access is performed in every backoff entity by using different parameter values for the AC-specific contention parameters. The AC-specific contention parameters are announced via information fields in beacon frames. The same AC-specific contention parameters are used by the backoff entities different WLAN devices in the network.

Each backoff entity within a WLAN device independently contends for a transmit opportunity (TXOP) of a packet. It starts down-counting the backoff-counter after detecting the medium being idle for a duration defined by the arbitration interframe space (AIFS) that is based on the value of the AC-specific contention parameter of the packet to be transmitted. The arbitration interframe space (AIFS) defines the earliest access time that the WLAN device may transmit the packet. Voice packets that have the AC-specific contention parameter AC_VO and video packets that have the AC-specific contention parameter AC_VI have a high value for access priority. Best effort basis packets that have the AC-specific contention parameter AC_BE have a medium value for access priority. Background packets that have the AC-specific contention parameter AC_BK have a low value for access priority.

The minimum size of the contention window, CWmin, for transmission of a packet, is another parameter dependent on the AC-specific contention parameter. The smaller the CWmin, the higher the priority of the packet for accessing the medium. Voice packets that have the AC-specific contention parameter AC_VO have the smallest contention window whereas background packets that have the AC-specific contention parameter AC_BK have the longest contention window.

B. Awareness Network Technology

Applications for short-range wireless devices are evolving to include awareness applications providing the device with an awareness about the local network environment. A non-limiting example awareness network architecture is the Nokia AwareNet framework, a network of wireless mobile devices self-organizing to support various applications, ranging from social networking to service discovery. Awareness information may be shared by a short-range wireless device sending an anonymous flooding message that may include a query, over an ad hoc network. A neighboring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices, build upon the IEEE 802.11 ad hoc mode or independent basic service set (IBSS), in which every device participates in beaconing and all the other basic operations that keep the ad hoc network in operation. An ad hoc network is designed to have one service set identifier (SSID) that all of the devices in the network share. The SSID is announced in the beacons transmitted by the devices. The basic service set identifier (BSSID) is intended to represent a beacon group of devices or network instance, rather than the whole network itself. The devices announce the BSSID they use and follow, in the beacons they transmit. In the overall design, those devices that operate under same SSID are driven to use a common and shared BSSID, since the BSSID of a wireless device in an ad hoc network becomes the BSSID of the oldest network instance value in the network. The determination of which BSSID is used by a device is made by the network instance timer value, and this timer value is communicated in beacons in the timing synchronization function (TSF) value parameter. The devices are required to operate by assuming the oldest TSF value (i.e. largest TSF value) contained in the received beacons that represent the network with the SSID in which the devices are operating.

When the radio and MAC of a wireless device transmits a Beacon, the Beacon MAC-header contains device's own current TSF value. The device may automatically transmit a reply message when it receives a Beacon from another network, the reply message being referred herein as a beacon response message. The beacon response message contains the current TSF value of the replying network.

When the radio and MAC of a wireless device receives a Beacon from another network instance during scanning, it passes to the Logical Link Control (LLC) layer of the wireless device: 1) its own TSF counter value at the time when the Beacon was received, and 2) the TSF value of the received Beacon (the other TSF). When the radio and MAC of a wireless device receives a beacon response message, the MAC passes to the Logical Link Control (LLC) layer of the wireless device, the beacon response message (including the other TSF) together with receiver's own TSF counter value at the time when the message was received.

Wireless devices form a network where all devices in proximity may communicate with each other. When two or more groups of devices forming two or more instances of the network come close to each other, the two or more instances may merge to become one network instance. Devices may make a merging or join decision to change the instance autonomously based on the TSF information collected from Beacons received during scan periods or based on the TSF information collected from received beacon response messages. A merging decision may be performed when a device receives a Beacon or beacon response message with an older (greater) TSF value from another wireless device. Two devices belong to different network instances 1) if their BSSIDs (network instance identifiers) are different; or 2) if their BSSIDs are the same and their TSF difference is greater than a fixed constant threshold value (for example 1000 μs). After the merging decision has been performed by a device, the device moves into the new network instance.

The awareness functionality in a short-range wireless device may be divided between four layers in the awareness architecture. The Awareness Layer and the Community Layer provide services for applications, i.e. provide the awareness API. The approximate functional split between the different layers is as follows.

Awareness Layer

According to an embodiment, Awareness Layer (AwL) has the highest level of control of the awareness architecture. Example services the AwL offers to the applications comprise Publish and Subscribe. The Awareness Layer receives publish and subscribe requests from applications and maps these into queries and query responses that, in turn, are mapped as awareness messages, the Network Layer PDU, that traverse from device to device. It also maps the awareness messages received by the device, to the application. The network layer does not appear as a data pipe for applications. A single awareness message is self-contained and short, the AwL compresses the messages in order for them to consume as little resources as possible.

The Awareness Layer may comprise an internal storage of awareness data items. Publishing an item normally means storing it in this internal storage (passive publish). Such an item is visible to other devices in the local vicinity and may be found using the Subscribe service. It is also possible to use active publishing that causes the Awareness Layer to issue a publish message that propagates from device to device. It is the responsibility of the AwL to decide whether a received message leads to the notification of an application (filtering). Items may be marked to be visible to only certain communities, so that they are visible only to searches made by members of such a community.

The Subscribe request causes the Awareness Layer to issue either a single or repetitive query message(s) that eventually propagate to other devices in the local vicinity (by using the functionality of lower awareness layers). When such a query message reaches the AwL of a device that happens to possess a matching information item, it responds with a reply message. The lower layers of awareness architecture take care of the routing of such a message back to the AwL of the querying device, which notifies the application of the other device that issued the Subscribe request.

Community Layer

The concept of communities has been integrally built into awareness architecture. Awareness communication may be visible to all the devices, or just to those that belong to a certain community. Regardless of this visibility, all wireless devices take part in the routing of messages. The role of the Community Layer (CoL) is to implement the community visibility rules. Only those messages that a certain device has visibility to (i.e. a device belongs to the same community as the message) are passed to the AwL. As an additional level of community privacy, messages are encrypted by the Community Layer. To allow such message filtering and encryption/decryption, the CoL stores the community credentials for those communities to which the user of the device belongs. The default awareness community (all local users) does not use any credentials and therefore its messages simply pass through the Community Layer.

According to an example embodiment, Awareness architecture comprises three different kinds of communities: the default awareness community, peer communities and personal communities. Communities may also be categorized with their privacy. Messages of public communities are transmitted as plain text whereas messages of private communities are transmitted encrypted. The default awareness community is the default community for all wireless devices. Awareness community messages are not encrypted and every node may send and receive awareness community messages (public community). In a peer community all members are equal and every member may receive all the community specific messages. A peer community may be public, or it may be private meaning that community messages are encrypted using a temporary key derived from the community specific shared key. The encryption function may be based on Advanced Encryption Standard, EAX mode (AES/EAX) with 128 bit keys. A personal community has a community owner that manages the community. A non-owner community member may communicate with the owner but not with other members of the community. A personal community is private, meaning that community messages from the owner to other members may be encrypted.

Network Layer

The Network Layer (NL) takes care of the local dissemination of the awareness messages. This is accomplished by way of a smart-flooding algorithm that attempts to adapt to the surrounding device density. At high densities, very few devices participate in the transmission of a given message. At low densities, all the devices may retransmit each message (normal flooding). The awareness network has a flat hierarchy; none of the devices may assume any special roles. Thus, at high densities, all the devices will transmit approximately the same amount of traffic (no clustering). The Network layer may also take care of the routing of the replies back to the device that issued the search. To this end, it collects routing information from the messages that flow through it. It also keeps track of all the neighbors and their approximate distance. Normally, reply routing uses unicast transmissions, whereas flooding messages are always broadcasted. All the messages received by the Network Layer are passed to Community Layer in order to check whether the message should be processed in the AwL.

Link Layer

Link Layer performs the adaptation between the underlying radio technology (e.g. IEEE 802.11 WLAN physical layer) and the Network Layer. It maps the specific information of the radio technology, such as radio identifiers and received signal strengths, into technology neutral information used by the Network Layer (NL). Multiple Link Layer instances may be used by the NL, e.g. for simultaneous usage of different radio technologies.

The Link Layer may be divided into two sub layers: logical link control (LLC) and media access control (MAC). LLC provides radio technology agnostic service for the Network Layer. It hides differences between radio technology specific MACs. LLC provides a single service access point for the Network layer. LLC knows how to map the generic provided service to the service provided by the technology specific MACs. The LLC internal data structures include the Neighbor Table that contains information of all the neighboring devices that have been heard in the recent past.

The Link Layer tries to transmit data via the given medium using the TransmitData functionality. Transmission may succeed or it may fail. Internally the Link Layer may try transmissions several times if a medium is temporarily busy. The Link Layer passes all the messages it receives to the Network Layer. This also includes unicast messages that are intended for other nodes.

The logical link control (LLC) is aware of radio technology specific MACs. In case of the IEEE 802.11 WLAN MAC example, the LLC does the following WLAN MAC specific actions:

Control (Reset, Configure) WLAN MAC.
Decide when to merge WLAN networks.
Construct a message package to be sent to WLAN MAC from outgoing messages.
Select which messages are to be sent and which are ignored immediately, e.g. if there are too many messages to be sent.
Extract incoming data messages contained in reception reports.
Update the Neighbor Table when reception reports and scan reports are received.

Merging of WLAN networks is the responsibility of the logical link control (LLC). The LLC determines when to merge two WLAN network instances or beacon groups as a single larger network instance or a beacon group. LLC calculates an estimate of its own WLAN network size. Estimation is based on information provided by the Network Layer, information found in the LLC Neighbor Table and network size category shared by other nodes. A network size category is calculated from an estimated network size.

The IEEE 802.11 WLAN MAC awareness mode enables a wireless device to use its power efficiently. In the awareness mode, the WLAN radio is asleep most of the time, thus reducing power consumption. Messages are transmitted and received in a batch mode, i.e. LLC passes all the messages that the MAC is to transmit during a single awake period, in a single package. The MAC passes all the messages received during a single awake period in a single reception report. The LLC collects messages to be transmitted in a single package. When the MAC is awake, the LLC passes the package to the MAC and it tries to transmit the messages. When the MAC is about to go asleep, it sends a transmission report to the LLC containing information about messages it has succeeded to transmit and about messages it has failed to transmit. In addition MAC passes a reception report to LLC. The report contains messages received during the awake period.

According to an embodiment, the merging or joining process is a purely local process that occurs entirely internally to the wireless device. The Awareness Layer of the wireless device may make a merging or join decision to join a particular network instance or beacon group, either autonomously, in response to an application, or in response to user input. There is no indication to the outside world that a device has joined a particular ad hoc network. Joining an ad hoc network may require that all of the mobile device's MAC and physical parameters be synchronized with the desired ad hoc network. To do this, the device may update its timer with the TSF value of the timer from the ad hoc network description, modified by adding the time elapsed since the description was acquired. This will synchronize the device's timer to the ad hoc network. The BSSID of the ad hoc network may be adopted, as well as the parameters in the capability information field. Once this process is complete, the wireless device has joined the ad hoc network and is ready to begin communicating with the wireless devices in the ad hoc network.

The IEEE 802.11 WLAN MAC awareness mode provides the following functionalities:

Reset MAC.
Configure MAC.
Join a WLAN network or create a new network.
Join an existing WLAN network (BSSID is known).
Set a template for beacon frames so that LLC parameters can be passed in WLAN beacon frames.
Try to transmit a set of messages.
Receive a set of incoming messages.
Receive a set of WLAN scan messages
Message Propagation According to an embodiment, the propagation of an awareness search message is conducted in the awareness architecture layers of different devices. An application initiates a subscription in the device by using the Subscribe service offered by the Awareness Layer. The Awareness Layer realizes the subscription by sending a query message to other devices. In all the devices the message goes at least up to the Community Layer. However, only in those devices that belong to the community to which the message was intended, does the message proceed to the AwL. There is no need to have an application present in the replying device. It is sufficient to only have the awareness platform active.

C. Contention Access in Wireless Communication

IEEE 802.11 wireless devices normally employ Carrier Sense Multiple Access (CSMA), wherein a spectrum sensing capability is used during an interval like the SIFS interval, DIFS interval or AIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle. Binary exponential backoff may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially.

The mobile device that starts an ad hoc network will begin by resetting its TSF timer to zero and transmitting a Beacon, choosing a beacon period, which establishes the basic beaconing process for this ad hoc network. After the ad hoc network has been established, each device in the ad hoc network will attempt to send a Beacon after the target beacon transmission time (TBTT) arrives, choosing a random delay value to avoid collisions. Each device in a beacon group receives a beacon including timing synchronization of the beacon group of which the device is a member. The synchronized devices in the beacon group should be simultaneously available during a discovery interval to listen for and to exchange messages. In accordance with an example embodiment of the invention, discovery intervals are aligned with TBTTs. Beginning of a discovery interval may be aligned with a TBTT. Alternatively, a discovery interval may be deemed to start upon reception or transmission of a beacon after a TBTT.

In accordance with an example embodiment of the invention, in order to spread out the period of contention for the wireless communications medium, each device in the beacon group performs a random draw for permission to start contention with other members of the group, for access to the wireless communications medium during the discovery interval. The random draw is based on how many members of the beacon group are expected to compete for the wireless communications medium. If the device wins the random draw, it starts contention for access to the wireless communications medium using carrier sense multiple access (CSMA) during the discovery interval.

In accordance with an example embodiment of the invention, at the beginning of the discovery interval (after synchronization phase or wake up) a STA that has at least one frame to be transmitted perform an autonomous random draw for permission to start contention. The draw is based on the number of STAs that are expected to compete over the medium. If the draw is winning, the STA is allowed to start the contention as per 802.11 CSMA rules. If drawing is losing, the STA starts to wait for the last frame from a TXOP. The last of the frames from a TXOP may be detected from the DIFS time. The last frame triggers those STAs that still have no permission to contend, to perform a random drawing, i.e. the STAs try to win the permission to start contention again. Each random draw is based on the number of STAs that expected to compete for the wireless communications medium at the time of the random draw. This procedure continues until a STA has transmitted its frames or until a pre-determined time has elapsed from the beginning of the discovery interval.

In an example embodiment of the invention, each device monitors the channel during the discovery interval and uses transmissions and silent periods in the channel to determine whether to start channel contention. In accordance with an example embodiment of the invention, completed transmissions from a device in a completed TXOPs are monitored. Completion of a TXOP by a currently transmitting device means that there is one less device contending for transmission during that discovery interval. This event may be used to determine whether another device in the beacon group may start contention. A TXOP comprises of a sequence of frames that follow each other with SIFS in between. Once the channel is sensed to be vacant for longer than the SIFS, one may assume a TXOP to be over and completed. As a non-limiting example, when the channel has been vacant for DIFS after a frame, then another device may transmit. Once we have that condition, a device that has frames to transmit and is not yet contending for transmission, may determine whether to start contending. In an example embodiment, DIFS is just one time value example and alternatively other time values may be used, as long as they are longer than the SIFS.

FIG. 1A illustrates an example network diagram of an ad hoc network 5 where all of the STAs are in the same contention group. In FIG. 1A, the example contention group is the same as a beacon group, that is a group of devices that have the same target beacon transmission time (TBTT). The contention group in FIG. 1A includes wireless devices STA1, STA2, STA3, and STA4. A beacon transmitted by one of the devices distributes its TSF value to the other receiving devices, synchronizing them so all of the devices in the contention group have a TSF value that is approximately the same. The beacon interval within the contention group is established by the first device that creates the contention group, which defines a series of TBTTs exactly a Beacon Period apart. The wireless devices within a beacon group synchronize by establishing a common time base provided by the timing synchronization function maintained in each device. The beacon frames that each device sends include the value of the device's TSF timer at the time that the beacon is transmitted. When a device receives a beacon from within its the beacon group, if the TSF value in the beacon is larger than the device's own TSF counter value, then the device adopts the TSF value communicated in the beacon.

In accordance with an example embodiment of the invention, at the beginning of the discovery interval (after synchronization phase or wake up) a STA that has at least one frame to be transmitted perform an autonomous random draw for permission to start contention. The draw is based on the number of STAs that are expected to compete over the medium. If the draw is winning, the STA is allowed to start the contention as per 802.11 CSMA rules. If drawing is losing, the STA starts to wait for the last frame from a TXOP. The last of the frames from a TXOP may be detected from the DIFS time. The last frame triggers those STAs that still have no permission to contend, to perform a random drawing, i.e. the STAs try to win the permission to start contention again. Each random draw is based on the number of STAs that expected to compete for the wireless communications medium at the time of the random draw. This procedure continues until a STA has transmitted its frames or until a pre-determined time has elapsed from the beginning of the discovery interval.

During contention, each wireless device waits for the random backoff interval and then sends its frame if the random delay has expired and no other frame has arrived from another device in the contention group during the delay period. FIG. 1A shows STA1 having won the random draw for permission to start contention and then to have successfully contended for access to the wireless communications medium to transmit its frame 140A.

FIG. 1B illustrates an example timing diagram for the network of FIG. 1A, showing how contention spreading works where all of the STAs are in the same contention group, in accordance with at least one embodiment of the present invention. The probability to win permission to contend grows with time, since devices that have already transmitted their frames then drop out of competition for the medium. An example sequence of events showing how contention spreading works, is depicted in FIG. 1B as follows:

(1) STA1, STA2, STA3, STA4 draw for permission to contend. STA1, STA2 win, STA3, STA4 lose.
(2) STA1 wins contention and TXOP contains 3 frames.
(3) STA3, STA4 draw for permission to contend, STA2 resumes backoff.STA3 wins, STA4 loses.
(4) STA3 wins contention and TXOP contains 1 frame.
(5) STA4 draw for permission to contend, STA2 resumes backoff.STA4 wins.
(6) STA3 wins contention and TXOP contains 2 frames.
(7) STA4 resumes backoff.
(8) STA4 wins contention and TXOP contains 1 frame.

The probability to win permission to contend may be related to N=number of neighboring STAs (neighbor table keeps track from the number). The simplest way to choose probability is to use p=1/(N+1) in every trigger. However, the sequence of probabilities can depend of number of triggers that have been observed. The probability could be chosen for instance so that in average n (e.g. 5) STAs win the permission to contend in a trigger. The sequence of draws can be written as:

Probability of kth draw:

$$pk=\text{Min }\{n/(N-k+1), 1\}, (k=1, \ldots, N, N \geq 1)$$

$$pk=1, (k>N \text{ or } N=0)$$

Draw for permission to contend:

$$r=\text{Uniform}(0,1), \text{ win if } r<p$$

where
k=draw counter within Discovery Interval (integer 1, ... )
N=estimated number of transmitting neighboring STAs inside Discovery Interval (integer 0, ... )
n=expected number of neighboring STAs that win permission to transmit in one trigger (constant≥1 e.g. 5)
r=uniformly distributed pseudo-random number drawn from interval [0,1] (real [0,1])
p=probability to win a permission to contend (real [0,1])

Special initial probabilities may be introduced in some special cases. For instance a STA may have initial probability 1 if the STA has not won the draw for long period of time.

FIG. 2A illustrates an example network diagram of the ad hoc network 5 of FIG. 1A, where a portion of the STAs, STA1 and STA2, are in a first contention group 1 and another portion of the STAs, STA3 and STA4, are in a second contention group 2, in accordance with at least one embodiment of the present invention.

In accordance with an example embodiment of the invention, each discovery interval comprises of sub-intervals that are each automatically assigned to a contention group. A STA that has at least one frame to be transmitted may belong to one contention group at a time and membership in the contention group determines the sub-interval during which the STA may contend for transmission. STA's membership in contention group is dynamic and the contention group to which a STA belongs is determined for each discovery interval independently.

In accordance with an example embodiment of the invention, at the beginning of the discovery interval (after synchronization phase or wake up) a STA that has at least one frame to be transmitted may perform an autonomous random draw for which contention group the STA belongs. The number of contention groups may be adaptive, based on the number of neighboring STAs. Also, the number of STAs in a contention group may also be adaptive. If a STA has drawn the first group, the STA is allowed to start the contention, as per 802.11 CSMA rules. If a STA has drawn some other group than the first group, the STA waits for the earlier groups to complete their transmissions before starting the contention. After the STAs in the first group have transmitted their frames (or the group has been empty, which may happen due to the probabilistic nature of the algorithm), the second group STAs is triggered to start contention. In general, the procedure is such that once STAs of a group have completed their transmissions, the next group of STAs is triggered to start contention and this continues until all of the groups have contended or alternatively a pre-determined time has elapsed from the beginning of the discovery interval. The triggering event is based on the extinction of traffic of the first contention group. A parameter may be included that determines traffic extinction. The procedure continues until all contention groups have transmitted their frames.

In accordance with an alternate example embodiment of the invention, at the beginning of the discovery interval (after synchronization phase or wake up) a STA that has at least one frame to be transmitted may perform an autonomous random draw for permission to start contention as a member of the first contention group. If the draw wins, the STA is allowed to start the contention as a member of the first contention group, as per 802.11 CSMA rules. If the draw fails, the STA waits for the first contention group STAs to complete their transmissions. After the STAs in the first group have transmitted their frames (or the group has been empty, which may happen due to the probabilistic nature of the algorithm), the STAs that have at least one frame to be transmitted and that did not contend in the first contention group, perform an autonomous random draw for permission to start contention as a member of the second contention group. If the draw wins, the STA is allowed to start the contention as a member of the second contention group, as per 802.11 CSMA rules. In general, the procedure is such that once STAs of a group have completed their transmissions, the STAs that haven't yet won a draw during the discovery interval, are triggered to draw for membership in the next contention group and this continues until all the groups have contended or alternatively a pre-determined time has elapsed from the beginning of the discovery interval. The triggering event is based on the extinction of traffic of the first contention group. A parameter may be included that determines traffic extinction. The procedure continues until all contention groups have been gone through. The number of contention groups may be adaptive, based on the number of neighboring STAs. Also, the number of STAs in a contention group may be adaptive.

Figure 2B:
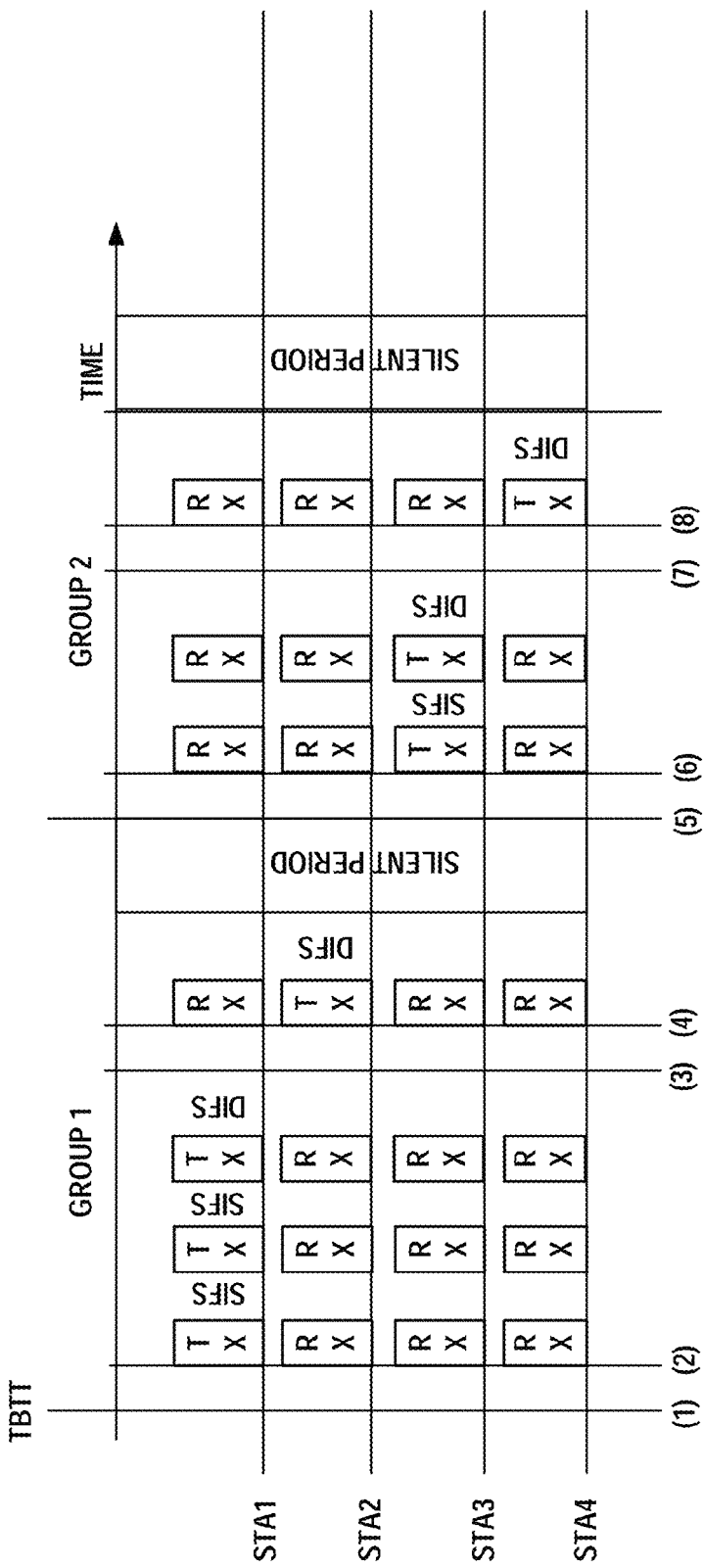
FIG. 2B illustrates an example timing diagram for the network of FIG. 2A, showing how contention spreading works where a portion of the STAs are in a first contention group and another portion of the STAs are in a second contention group, in accordance with at least one embodiment of the present invention.

FIG. 2B illustrates an example timing diagram for the network of FIG. 2A, showing how contention spreading works where a portion of the STAs draw for a first contention group and another portion of the STAs draw for a second contention group, in accordance with at least one embodiment of the present invention. Contention group 1 is first followed by a silent period that is followed by contention group 2 and then another silent period. An example sequence of events showing how contention spreading works for two contention groups, is depicted in FIG. 2B as follows:

(1) STA1, STA2, STA3, STA4 draw for contention group-.STA1, STA2 are in first group, STA3 and STA4 in second group.
   (2) STA1 wins contention and TXOP contains 3 frames.
   (3) STA2 resumes backoff.
   (4) STA2 wins contention and TXOP contains 1 frame.
   (5) STA3 and STA4 start to contend (second group).
   (6) STA2 wins contention and TXOP contains 2 frames.
   (7) STA4 resumes backoff.
   (8) STA4 wins contention and TXOP contains 1 frame.
The number of contention groups can be for instance $$M=\text{Ceil}(\text{Max}\{(N+1)/n, 1\})$$

Draw which contention group:

$$g=\text{Ceil}(M*\text{Uniform}(0,1))$$

where
  M=number of contention groups (integer 1, . . . )
  N=number of neighboring STAs (integer 0, . . . )
  n=expected number of neighboring STAs in a contention group (constant≥1 e.g. 5)
  g=group number (integer 1, . . . , M)

Detection when groups change may be done with a simple timer. If there has not been traffic for a certain short period of time ("Silent period"), the timer expires and next group is then on. A frame reception pauses the timer and a frame reception reschedules the timer. The timer expiration time can be for example 2 times*DIFS.

Special initial probabilities may be introduced in some special cases.

In an example embodiment of the invention, the messages transmitted by wireless devices in a beacon group may be propagated in consecutive hops from a sender device to a receiver device and retransmitted to a next receiver device, using a smart flooding and routing protocol managed by the network layer in each device. Whenever a wireless device schedules transmission for any message, the smart flooding and routing protocol procedure may be executed. For unicast messages, the latest routing information is obtained from a Routing Table in the network layer before forwarding the message to the Link Layer of the device for transmission. The hop count value in the received message is incremented by one by each consecutive receiving device. When the maximum hop count is reached in a receiving device, as specified in the received message, the message is removed from the Message transmission buffer in the device. In an alternate embodiment, the hop count value may be initially set to the maximum hop count and decremented by one with each hop. When the hop count reaches zero, then the message is removed from the message transmission buffer in the device.

In an example embodiment of the invention, the network layer in a wireless device manages incoming messages and retransmissions with the smart-flooding and routing protocol. When a wireless device receives a message, it may perform the following operations:

1. It updates the internal tables (neighbor table, routing table and medium table) based on the message information.
   2. It checks whether it already "knows" this message by "looking" at its message ID (MsgID) information that can be obtained from the network layer header. If yes, the message reception is counted and the message is discarded. If the reception-counter for a certain message has reached a threshold, the previously scheduled retransmission of that message is cancelled.
   3. The message is scheduled for further transmission. For a message with a destination address, retransmission may be the next possible transmission opportunity. For a message without a destination address, retransmission may be delayed until later.
   4. The message is provided to upper layers, i.e., the community layer and the awareness layer, for processing.

Figure 3:
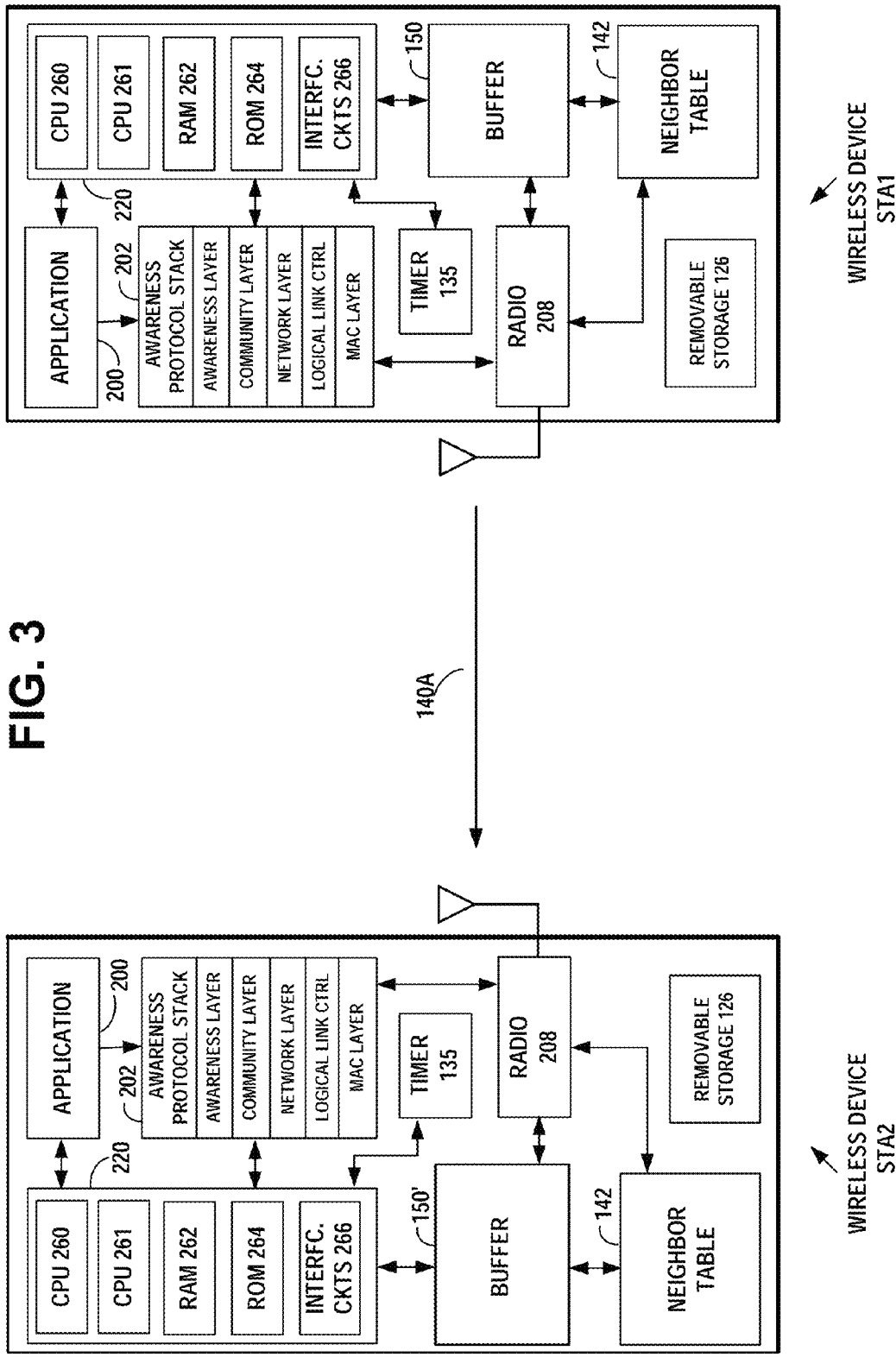
FIG. 3 is an example functional block diagram of the wireless device STA1 and the wireless device STA2 of FIG. 1A, in accordance with at least one embodiment of the present invention.

FIG. 3 is an example functional block diagram of the wireless device STA1 and the wireless device STA2 of FIG. 1A, in accordance with at least one embodiment of the present invention. FIG. 3 shows an example embodiment of the internal architecture of the wireless device STA2 receiving the packet 140A from the wireless device STA1 and an example embodiment of the internal architecture of the wireless devices STA1 and STA2. The wireless device STA2 listens with radio 208 on a medium for a period of time and adds any received beacons or frames to its cached BSSID scan list in its RAM 262. The figure shows the wireless device STA2 receiving a frame 140A from the wireless device STA1.

In an example embodiment of the invention, the wireless device STA1 and the wireless device STA2 may be a communications device, PDA, cell phone, laptop or palmtop computer, or the like or it may be a stationary access point, automotive dashboard interface, home electronics interface or other stationary interface or device. The wireless device STA1 and the wireless device STA2 may be a remote controller, healthcare monitor, sports sensor, token, key fob, watch, wireless keyboard, gaming pad, body sensor, toy, health care equipment, human interface device, entertainment device, wireless microphone, GPS sensor, or the like.

In an example embodiment of the invention, the wireless device STA1 and the wireless device STA2 may include a processor 220 that includes a single core or multi-core central processing unit (CPU) 260 and 261, a random access memory (RAM) 262, a read only memory (ROM) 264, and interface circuits 266 to interface with the radio transceiver 208. The wireless device STA1 and the wireless device STA2 may each further include a battery and other power sources, key pad, touch screen, display, microphone, speakers, ear pieces, camera or other imaging devices, etc. The RAM 262 and ROM 264 may be removable memory devices such as smart cards, SIMs, WIMs, semiconductor memories such as RAM, ROM, PROMS, flash memory devices, etc. according to an embodiment of the present invention. According to an example embodiment of the invention, the wireless device STA1 and the wireless device STA2 each include the awareness protocol stack 202.

In an example embodiment of the invention, the awareness protocol stack 202 may include the Awareness Layer, the Community Layer, the Network Layer, and the Link Layer that is divided into two sub layers: the logical link control (LLC) and the media access control (MAC). The Neighbor Table 142 in the logical link control (LLC), may include a list of all the network instances having member neighboring devices that have been heard from in the recent past. In an example embodiment of the invention, for each network instance in the neighbor table, a record or entry is made of at least its SSID and BSSID, which are recorded from the values in the most recently received beacon or beacon response message from the network instance. In an example embodiment of the invention, the neighbor table may also include the TSF value from a network instance, and it may be updated from the beacons and beacon response messages received from the network instance. The record may also include the received signal strength and an identifying indicium entered by the user or the application that identifies past memberships with the network instance, conversational sessions with a user of a device in the network instance, or other characteristics of the network instance. The Neighbor Table 142 in the logical link control (LLC) is updated when reception reports and scan reports are received from the MAC layer. The MAC passes to the LLC in the reception report, the SSID, BSSID, and other values of all the messages received during the previous awake period.

Figure 5:
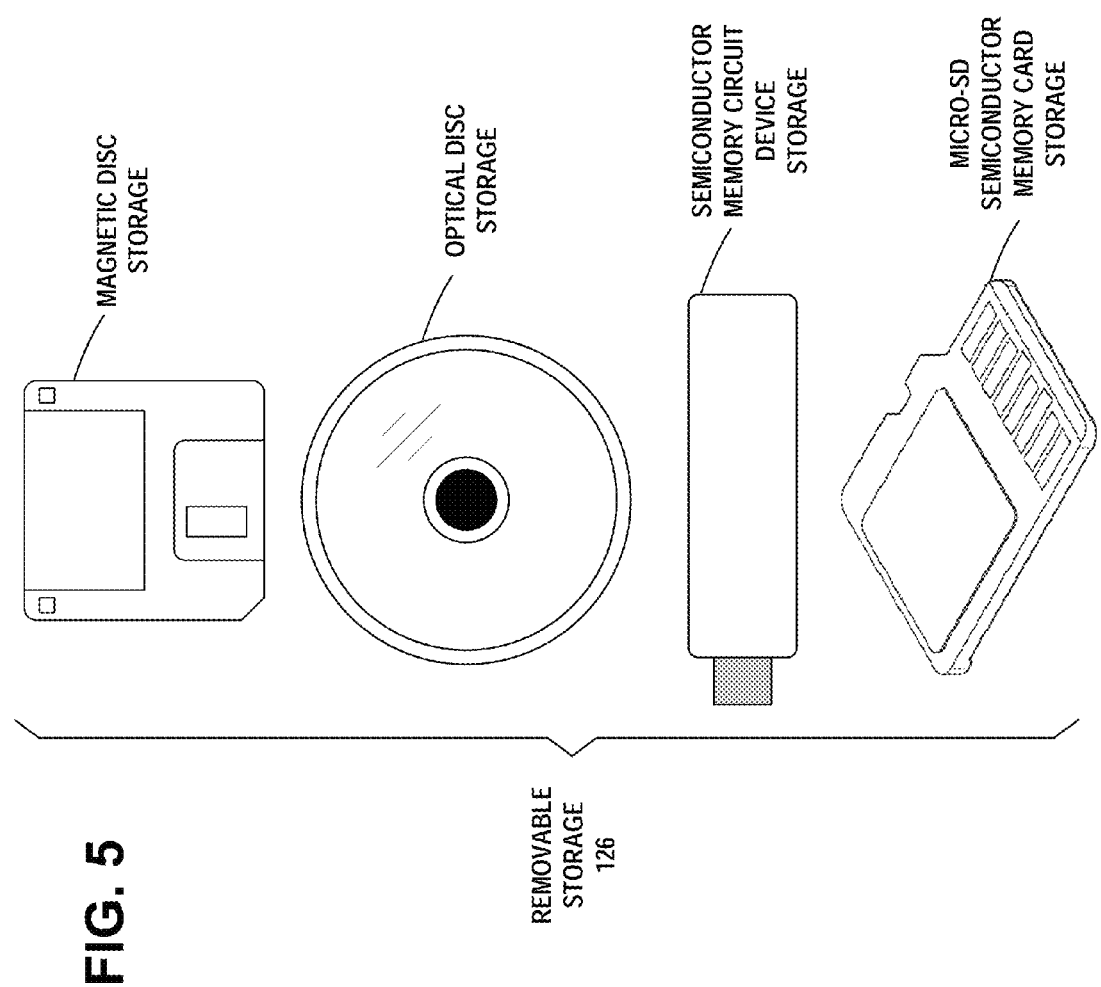
FIG. 5 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

In an example embodiment of the invention, the processor 220, protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the wireless device STA1 and the wireless device STA2 from a computer program product or article of manufacture in the form of computer-usable media such as resident memory devices, smart cards or other removable memory devices, as illustrated in FIG. 5. Alternately, they may be embodied as integrated circuit logic in the form of programmed logic arrays or custom designed application specific integrated circuits (ASIC). The radio 208 in the each of the wireless device STA1 and the wireless device STA2 may be separate transceiver circuits or alternately, the radio 208 may be a single radio module capable of handling one or multiple mediums in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the wireless device STA1 and the wireless device STA2 for execution of the program code for example by the CPUs 260 and/or 261. Removable storage media 126 are shown in FIG. 5.

Figure 4:
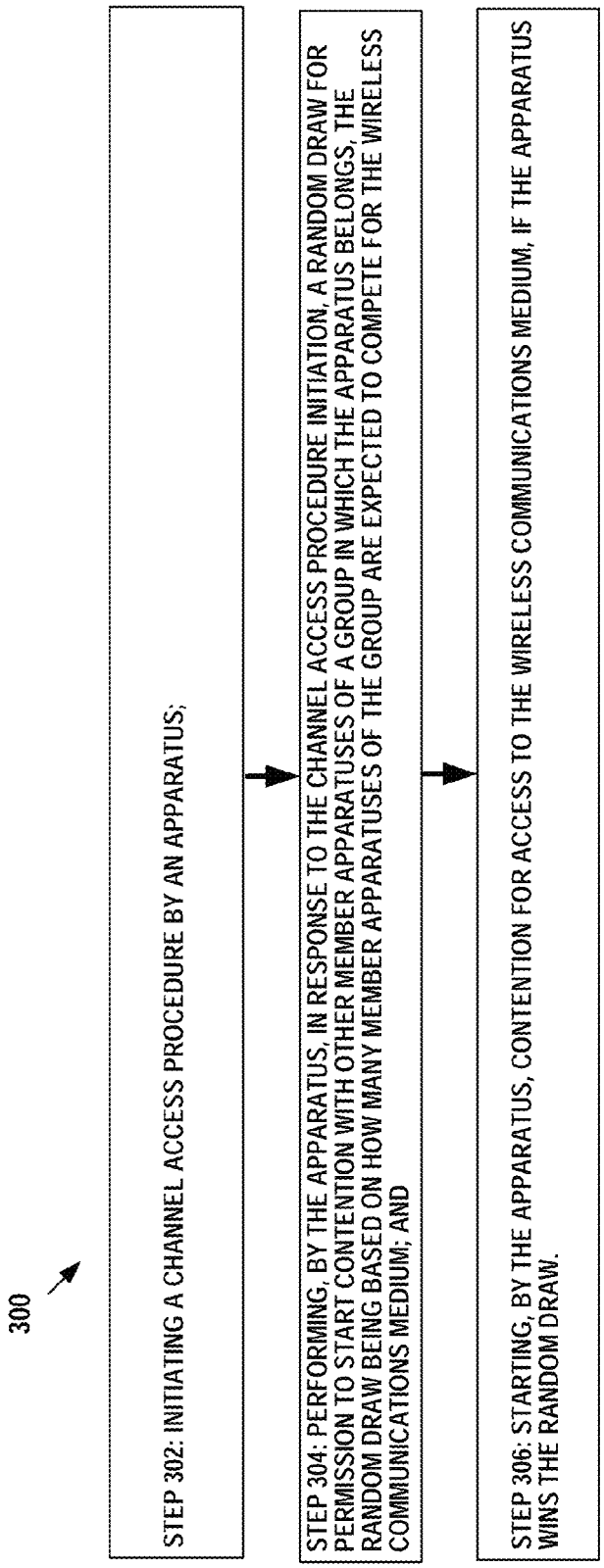
FIG. 4 is an example flow diagram of operational steps in the wireless device STA1 of FIG. 1A, in accordance with at least one embodiment of the present invention.

FIG. 4 illustrates an example flow diagram 300 of an example operation of the wireless device STA1, in accordance with an example embodiment of the invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 302: initiating a channel access procedure by an apparatus;

Step 304: performing, by the apparatus, in response to the channel access procedure initiation, a random draw for permission to start contention with other member apparatuses of a group in which the apparatus belongs, the random draw being based on how many member apparatuses of the group are expected to compete for the wireless communications medium; and Step 306: starting, by the apparatus, contention for access to the wireless communications medium, if the apparatus wins the random draw.

In an example embodiment of the invention, the method in the flow diagram of FIG. 4 may further comprise:

waiting, by the apparatus, until another member apparatus of the group completes its access to the wireless communications medium if the apparatus did not win the random draw;

performing, by the apparatus, a second random draw for permission to start a second contention with other members of the group, for access to the wireless communications medium, the second random draw being based on how many members of the group are expected to compete in the second random draw for permission to start contention for the wireless communications medium; and starting, by the apparatus, the second contention for access to the wireless communications medium, if the apparatus wins the second random draw.

In an example embodiment of the invention, the method in the flow diagram of FIG. 4 may further comprise:

wherein the channel access procedure initiation is triggered in response to receiving, by the apparatus, a wireless message including timing synchronization of the group of which the apparatus is a member.

In an example embodiment of the invention, the method in the flow diagram of FIG. 4 may further comprise:

wherein the channel access procedure initiation is triggered in response to transmitting, by the apparatus, a wireless message including timing synchronization of the group of which the apparatus is a member.

In an example embodiment of the invention, the method in the flow diagram of FIG. 4 may further comprise:

wherein the channel access procedure initiation is triggered in response to determining by the apparatus that a predetermined amount of time has elapsed from targeted transmission time of a wireless message including timing synchronization of the group of which the apparatus is a member.

In an example embodiment of the invention, the method in the flow diagram of FIG. 4 may further comprise:

the contention for access to the wireless communications medium is by carrier sense multiple access.

FIG. 5 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, a method may comprise:

receiving, by an apparatus, a wireless message including timing synchronization of a group of which the apparatus is a member;

performing, by the apparatus, a random draw for membership in a first contention group, members of the first contention group having permission to start contention with other members of the first contention group, for access to the wireless communications medium, the random draw being based on how many members of the first said group are expected to compete for membership in the first contention group;

starting, by the apparatus, contention for access to the wireless communications medium, if the apparatus wins the random draw for membership in the first contention group;

waiting, by the apparatus, until members of the first contention group complete their access of the wireless communications medium;

performing, by the apparatus, a second random draw for membership in a second contention group, members of the second contention group having permission to start contention with other members of the second contention group after the members of the first contention group have completed their access of the wireless communications medium, the second random draw being based on how many members of the first said group are expected to compete in the second contention for membership in the second contention group; and starting, by the apparatus, the second contention for access to the wireless communications medium, if the apparatus wins the second random draw.

Although specific example embodiments have been disclosed, a person skilled in the art will understand that changes can be made to the specific example embodiments without departing from the spirit and scope of the invention.

What is claimed is:

1. A method, comprising:
   initiating a channel access procedure by an apparatus;
   performing, by the apparatus, in response to the channel access procedure initiation, a random draw for permission to start contention with other member apparatuses of a group in which the apparatus belongs, the random draw being based on how many member apparatuses of the group are expected to compete for the wireless communications medium;
   starting, by the apparatus, contention for access to the wireless communications medium, if the apparatus wins the random draw;
   waiting, by the apparatus, until another member apparatus of the group completes its access to the wireless communications medium if the apparatus did not win the random draw;
   performing, by the apparatus, a second random draw for permission to start a second contention with other members of the group, for access to the wireless communications medium, the second random draw being based on how many members of the group are expected to compete in the second random draw for permission to start contention for the wireless communications medium; and
   starting, by the apparatus, the second contention for access to the wireless communications medium, if the apparatus wins the second random draw.

2. The method of claim 1, wherein the channel access procedure initiation is triggered in response to receiving, by the apparatus, a wireless message including timing synchronization of the group of which the apparatus is a member.

3. The method of claim 1, wherein the channel access procedure initiation is triggered in response to transmitting, by the apparatus, a wireless message including timing synchronization of the group of which the apparatus is a member.

4. The method of claim 1, wherein the channel access procedure initiation is triggered in response to determining by the apparatus that a predetermined amount of time has elapsed from targeted transmission time of a wireless message including timing synchronization of the group of which the apparatus is a member.

5. The method of claim 1, wherein the contention for access to the wireless communications medium is by carrier sense multiple access.

6. An apparatus, comprising:
   at least one processor;
   at least one memory including computer program code;
   the at least one memory and the computer program code configured to, with the at least one processor, cause the apparatus at least to:
   initiate a channel access procedure;
   perform in response to the channel access procedure initiation, a random draw for permission to start contention with other member apparatuses of a group in which the apparatus belongs, the random draw being based on how many member apparatuses of the group are expected to compete for the wireless communications medium;
   start contention for access to the wireless communications medium, if the apparatus wins the random draw;
   wait until another member apparatus of the group completes its access to the wireless communications medium if the apparatus did not win the random draw;
   perform a second random draw for permission to start a second contention with other members of the group, for access to the wireless communications medium, the second random draw being based on how many members of the group are expected to compete in the second random draw for permission to start contention for the wireless communications medium; and
   start the second contention for access to the wireless communications medium, if the apparatus wins the second random draw.

7. The apparatus of claim 6, wherein the channel access procedure initiation is triggered in response to receiving, by the apparatus, a wireless message including timing synchronization of the group of which the apparatus is a member.

8. The apparatus of claim 6, wherein the channel access procedure initiation is triggered in response to transmitting, by the apparatus, a wireless message including timing synchronization of the group of which the apparatus is a member.

9. The apparatus of claim 6, wherein the channel access procedure initiation is triggered in response to determining by the apparatus that a predetermined amount of time has elapsed from targeted transmission time of a wireless message including timing synchronization of the group of which the apparatus is a member.

10. The apparatus of claim 6, wherein the contention for access to the wireless communications medium is by carrier sense multiple access.

11. A computer program product comprising computer executable program code recorded on a computer readable non-transitory storage medium, the computer executable program code comprising:
   code for initiating a channel access procedure by an apparatus;
   code for performing, by the apparatus, in response to the channel access procedure initiation, a random draw for permission to start contention with other member apparatuses of a group in which the apparatus belongs, the random draw being based on how many member apparatuses of the group are expected to compete for the wireless communications medium;
   code for starting, by the apparatus, contention for access to the wireless communications medium, if the apparatus wins the random draw;
   code for waiting, by the apparatus, until another member apparatus of the group completes its access to the wireless communications medium if the apparatus did not win the random draw;
   code for performing, by the apparatus, a second random draw for permission to start a second contention with other members of the group, for access to the wireless communications medium, the second random draw being based on how many members of the group are expected to compete in the second random draw for permission to start contention for the wireless communications medium; and
   code for starting, by the apparatus, the second contention for access to the wireless communications medium, if the apparatus wins the second random draw.

12. The computer program product of claim 11, wherein the channel access procedure initiation is triggered in response to receiving, by the apparatus, a wireless message including timing synchronization of the group of which the apparatus is a member.

13. The computer program product of claim 11, wherein the channel access procedure initiation is triggered in response to transmitting, by the apparatus, a wireless message including timing synchronization of the group of which the apparatus is a member.

14. The computer program product of claim 11, wherein the channel access procedure initiation is triggered in response to determining by the apparatus that a predetermined amount of time has elapsed from targeted transmission time of a wireless message including timing synchronization of the group of which the apparatus is a member.

15. The computer program product of claim 11, wherein the contention for access to the wireless communications medium is by carrier sense multiple access.

* * * * *